United States Patent
Nakamura et al.

(10) Patent No.: US 10,845,194 B2
(45) Date of Patent: Nov. 24, 2020

(54) INERTIAL FORCE DETECTION DEVICE

(71) Applicant: Hitachi Automotive Systems, Ltd., Hitachinaka (JP)

(72) Inventors: Toshiaki Nakamura, Tokyo (JP); Masahide Hayashi, Hitachinaka (JP); Yasutaka Tsuru, Hitachinaka (JP); Kazuo Ono, Tokyo (JP)

(73) Assignee: HITACHI AUTOMOTIVES SYSTEMS, LTD., Hitachinaka (JP)

( * ) Notice: Subject to any disclaimer, the term of this patent is extended or adjusted under 35 U.S.C. 154(b) by 170 days.

(21) Appl. No.: 16/075,048

(22) PCT Filed: Jan. 13, 2017

(86) PCT No.: PCT/JP2017/000911
§ 371 (c)(1),
(2) Date: Aug. 2, 2018

(87) PCT Pub. No.: WO2017/149947
PCT Pub. Date: Sep. 8, 2017

(65) Prior Publication Data
US 2019/0041214 A1    Feb. 7, 2019

(30) Foreign Application Priority Data

Feb. 29, 2016 (JP) ................. 2016-036555

(51) Int. Cl.
*G01P 15/125* (2006.01)
*G01C 19/5776* (2012.01)
(Continued)

(52) U.S. Cl.
CPC ........ *G01C 19/5776* (2013.01); *G01P 15/125* (2013.01); *G01P 21/00* (2013.01); *G01P 15/18* (2013.01)

(58) Field of Classification Search
CPC ... G01C 19/5776; G01P 21/00; G01P 15/125; G01P 15/18
See application file for complete search history.

(56) References Cited

U.S. PATENT DOCUMENTS

2005/0052096 A1    3/2005    Yamashita
2011/0146402 A1    6/2011    Donadel et al.
(Continued)

FOREIGN PATENT DOCUMENTS

CN    1595172 A    3/2005
JP    3162149 B2    9/1993
(Continued)

OTHER PUBLICATIONS

Office Action issued in corresponding Chinese Application No. 201780009425.0 dated Dec. 17, 2020, with English machine translation.
(Continued)

Primary Examiner — Suman K Nath
(74) Attorney, Agent, or Firm — Foley & Lardner LLP

(57) ABSTRACT

The present invention addresses the problem of providing an inertial force detection device with which it is possible to diagnose sensor output without hindrance even when a vehicle is traveling. In order to solve this problem, there is provided an inertial force detection device for measuring inertial force according to a displacement amount of an oscillating body, wherein a diagnosis voltage that is synchronous with an output command signal inputted from the outside is applied. Furthermore, the period over which the diagnosis voltage is applied is shorter, by a prescribed period, than a cycle of the output command signal. Furthermore, at least one of the period over which the diagnosis voltage is applied, the diagnosis voltage, a diagnosis thresh-
(Continued)

old value, and a filter characteristic is varied according to the cycle of the output command signal.

7 Claims, 4 Drawing Sheets

(51) Int. Cl.
 *G01P 21/00* (2006.01)
 *G01P 15/18* (2013.01)

(56) References Cited

U.S. PATENT DOCUMENTS

2013/0218505 A1 8/2013 Bhandari et al.
2017/0012602 A1* 1/2017 Kanazawa ............. H03H 9/215

FOREIGN PATENT DOCUMENTS

| JP | H05-223844 A | 9/1993 |
| JP | H11-230978 A | 8/1999 |
| JP | 2008-107108 A | 5/2008 |

OTHER PUBLICATIONS

International Search Report with English translation and Written Opinion issued in corresponding application No. PCT/JP2017/000911 dated May 9, 2017.

* cited by examiner

INERTIAL FORCE DETECTION DEVICE

TECHNICAL FIELD

The present invention relates to an inertial force detection device.

BACKGROUND ART

An acceleration sensor that detects an inertial force, for example, acceleration, is mounted on a vehicle such as an automobile and a train, and it is essential to ensure a normal operation of the acceleration sensor during traveling. Here, a method of performing diagnosis by displacing a detection element with an electrostatic attraction force caused by applying a voltage for diagnosis to the detection element for acceleration is mainstream in diagnosis of the acceleration sensor. Among devices for detecting the inertial force of the vehicle, for example, devices described in PTLs 1 and 2 are disclosed as a self-diagnosis method during the operation of the acceleration sensor. PTL 1 describes an example in which, when a diagnosis period and an acceleration output timing overlap each other, a value obtained by subtracting a diagnosis voltage equivalent value (fixed value) is output as an acceleration. In addition, in PTL 2, a movable portion is caused to oscillate at a frequency higher than an upper limit of a frequency at which acceleration to be detected changes, and a determination unit performs self-diagnosis of an abnormality of a sensor unit based on a sensor signal output from the acceleration sensor at this time. PTL 2 describes an example in which the sensor signal from the acceleration sensor is filtered by a digital filter so that a frequency component corresponding to an oscillation frequency of the movable portion is removed.

CITATION LIST

Patent Literature

PTL 1: Japanese Patent No. 3162149
PTL 2: JP 2008-107108 A

SUMMARY OF INVENTION

Technical Problem

In PTLs 1 and 2, however, it is difficult to obtain a correct acceleration detection result during diagnosis, or a time for which influence of voltage application remains is long even after diagnosis so that it is necessary to lengthen an acceleration detection cycle.

Therefore, an object of the present invention is to provide an inertial force detection device capable of performing diagnosis without disturbing a sensor output even when a vehicle is traveling.

Solution to Problem

In order to solve the above-described problem, an inertial force detection device that measures an inertial force based on a displacement amount of an oscillator is configured to apply a diagnosis voltage in synchronization with an output instruction signal input from outside as an example of the inertial force detection device of the present invention.

Advantageous Effects of Invention

It is possible to provide the inertial force detection device capable of performing diagnosis without disturbing the sensor output even when the vehicle is running.

DESCRIPTION OF EMBODIMENTS

Embodiments of the present invention will be described with reference to FIGS. 1 to 9.

Figure 1:
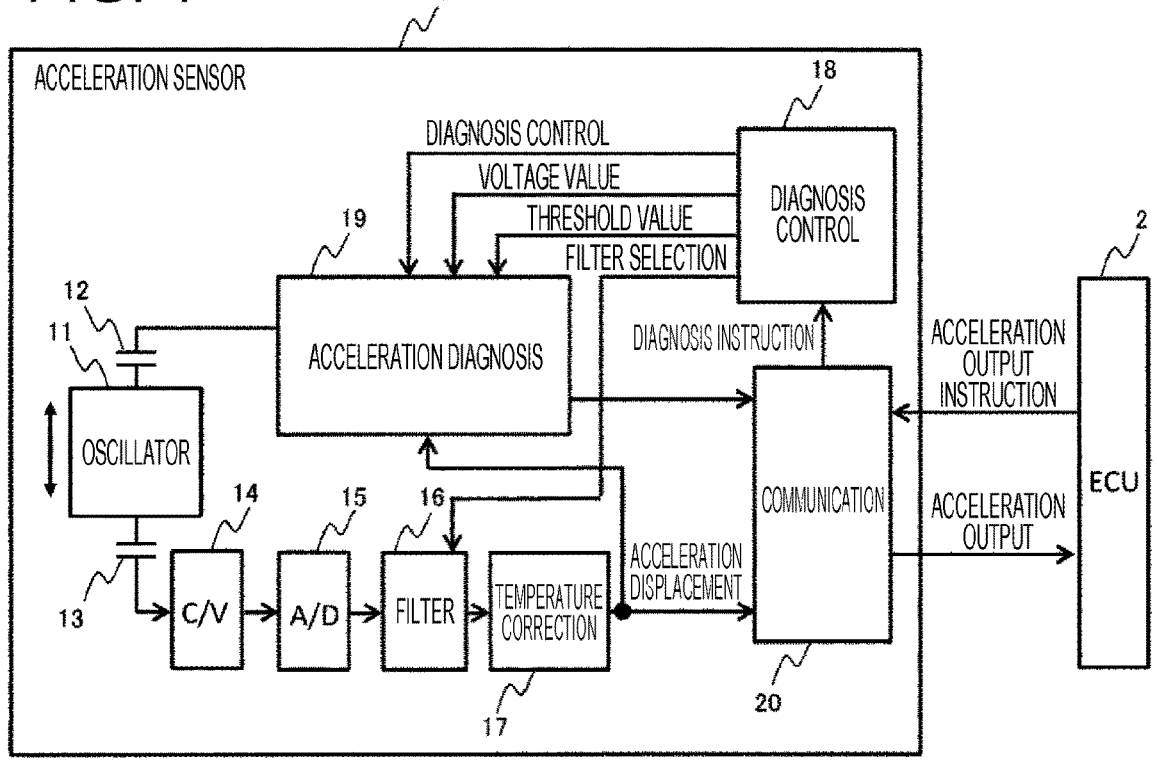
FIG. 1 is a block diagram of an acceleration sensor of an embodiment.

FIG. 1 is a block diagram of an acceleration sensor according to an embodiment. The acceleration sensor of this embodiment has an oscillator 11 and electrodes 12 and 13. The oscillator 11 is displaced when acceleration is applied in the vertical direction of the drawing. The electrode 12 applies a voltage and forcibly displaces the oscillator 11 in the vertical direction. The electrode 13 detects the amount of displacement in the vertical direction based on a change in electrostatic capacitance. A capacitance detector 14 detects a change in electrostatic capacitance caused by the displacement and outputs the detected change as a voltage. An AD converter 15 converts the voltage detected by the capacitance detector 14 into a digital signal.

A filter 16 has a function of removing high-frequency noise through low-pass filter processing at the time of ordinary acceleration detection. On the other hand, at the time of acceleration diagnosis, the filter 16 has a function of outputting a difference between an acceleration value immediately before diagnosis and an acceleration value during diagnosis in response to an input signal from diagnosis control 18 and a function of changing characteristics of a low-pass filter between the acceleration detection and the acceleration diagnosis. Details will be described with reference to FIG. 4.

Temperature correction 17 is a function of detecting ambient temperature using a temperature sensor and correcting an acceleration output value in response to the detected value. The diagnosis control 18 is a function of generating a control signal to execute the acceleration diagnosis with respect to an acceleration diagnosis unit 19 and the filter 16 in accordance with a cycle of a transmission instruction when the transmission instruction of an acceleration output has been input from an engine control unit (ECU) 2, which is an external device, and outputting the generated control signal. Details will be described with reference to FIG. 2.

The acceleration diagnosis 19 performs diagnosis with respect to an acceleration displacement output passing from the capacitance detector 14 to the temperature correction unit 17 by applying a voltage for diagnosis to the fixed electrode 12 of the oscillator 11 to forcibly displace the oscillator 11, and determines whether components from the oscillator 11 to the temperature correction 17 normally operate. Details will be described with reference to FIG. 3.

Communication 20 transmits the acceleration output corrected by the temperature correction 17 and a diagnosis output of the acceleration diagnosis 19 to the external device such as the ECU 2.

Figure 2:
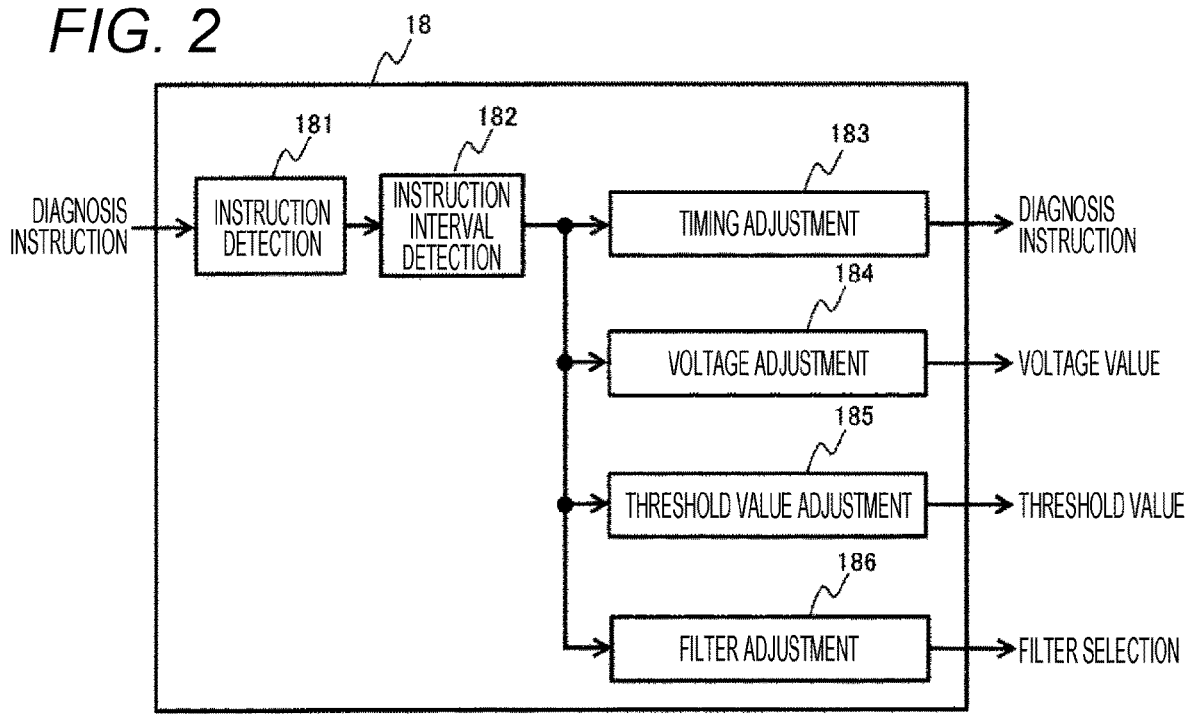
FIG. 2 is a block diagram of a diagnosis control function of the embodiment.

Next, instruction detection 181 to describe the diagnosis control 18 with reference to FIG. 2 is a function of detecting whether a signal received from the ECU 2 is an acceleration output instruction command. Command interval detection 182 is a function of detecting a reception interval of the acceleration output instruction command received from the ECU 2.

Timing adjustment 183 is a function of adjusting a diagnosis time in accordance with the reception interval of the acceleration output instruction. The voltage adjustment 184 is a function of adjusting the amplitude and polarity of a diagnostic applied voltage according to the reception interval of the acceleration output instruction.

Threshold value adjustment 185 is a function of adjusting a threshold value for determining whether the acceleration displacement amount at the time of acceleration diagnosis is normal in accordance with the reception interval of the acceleration output instruction. Filter adjustment 186 is a function of selecting a low-pass filter to be subjected to an acceleration displacement value at the time of detection and at the time of diagnosis to the filter 16 in accordance with the reception interval of the acceleration output instruction, and outputting a signal to select a difference from an acceleration value immediately before the diagnosis at the time of diagnosis.

Figure 3:
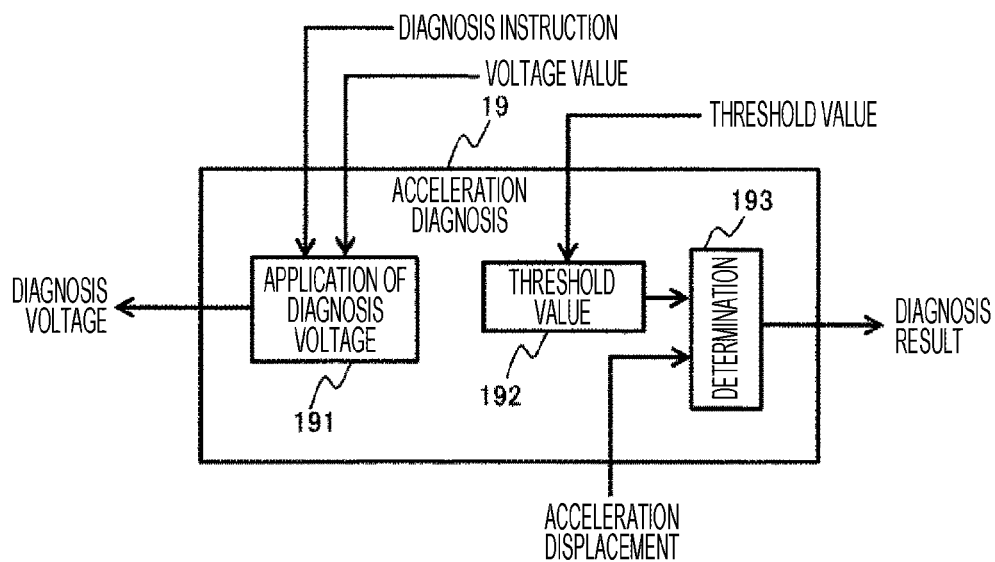
FIG. 3 is a block diagram of an acceleration diagnosis function of the embodiment.

Next, the acceleration diagnosis 19 will be described with reference to FIG. 3.

Diagnosis voltage application 191 is a function of applying a voltage to the electrode 12 to forcibly displace the oscillator 11 in the vertical direction in FIG. 1 in order to diagnose whether the acceleration sensor normally operates. A threshold value 192 is a register that stores a threshold value for determining whether the acceleration displacement value input from the filter 16 falls within a normal range. For example, an upper limit value and a lower limit value are stored as the threshold values. Determination 193 compares the acceleration displacement value with the upper limit value and the lower limit value, which are the threshold values, and determines that the operation is normal if the acceleration displacement value falls within the range.

Figure 4:
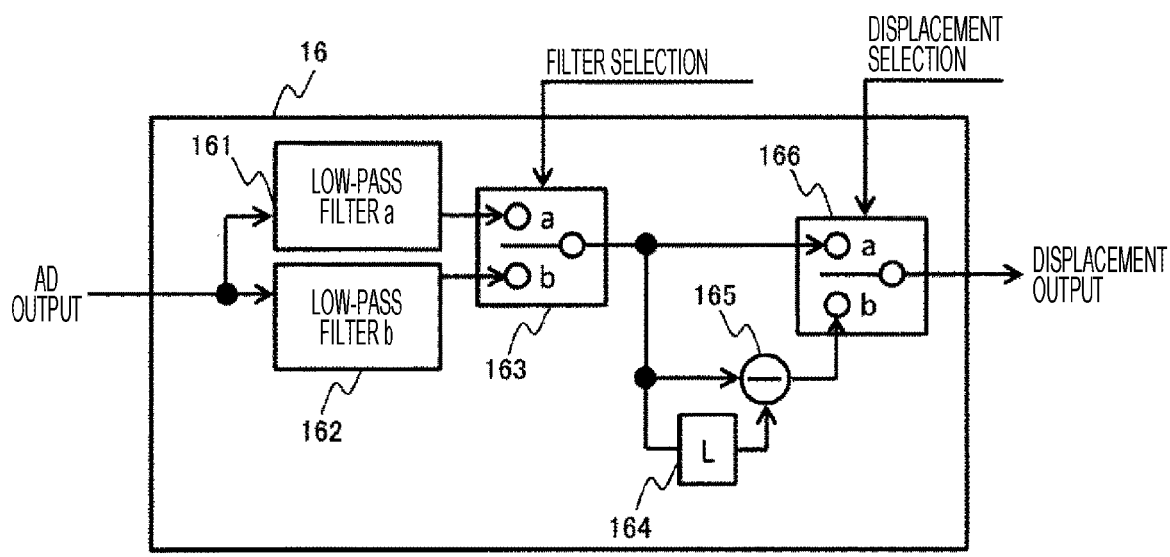
FIG. 4 is a block diagram of a filter function of the embodiment.

Next, the filter 16 will be described with reference to FIG. 4.

A low-pass filter a 161 is a low-pass filter that is applied at the time of acceleration detection. On the other hand, a low-pass filter b 162 is a low-pass filter that is applied at the time of acceleration diagnosis. At the time of acceleration diagnosis, a cutoff frequency of the low-pass filter b 162 is higher than that of the low-pass filter a 161 in order to shorten rise and fall time of the acceleration displacement due to the application of the diagnosis voltage.

A switch 163 is a function of selecting one of two input signals. A filter selection signal is used to select and output an output of the low-pass filter a at the time of acceleration detection and an output of the low-pass filter a at the time of acceleration diagnosis.

A latch 164 is a function of holding the acceleration displacement value immediately before acceleration diagnosis. A subtractor 165 is a function of subtracting the acceleration displacement value immediately before starting diagnosis from the acceleration displacement value at the time of acceleration diagnosis. An object of this function is to extract only the acceleration displacement caused by application of the diagnosis voltage in a state where a vehicle equipped with the acceleration sensor stops on a slope or acceleration is generated during traveling.

The switch 164 is a function of selecting one of two input signals. Based on a displacement selection signal, at the time of acceleration detection, an acceleration displacement at this point in time is selected and output, and an acceleration displacement is selected and output for application of the diagnosis voltage and at the time of acceleration diagnosis.

Figure 5:
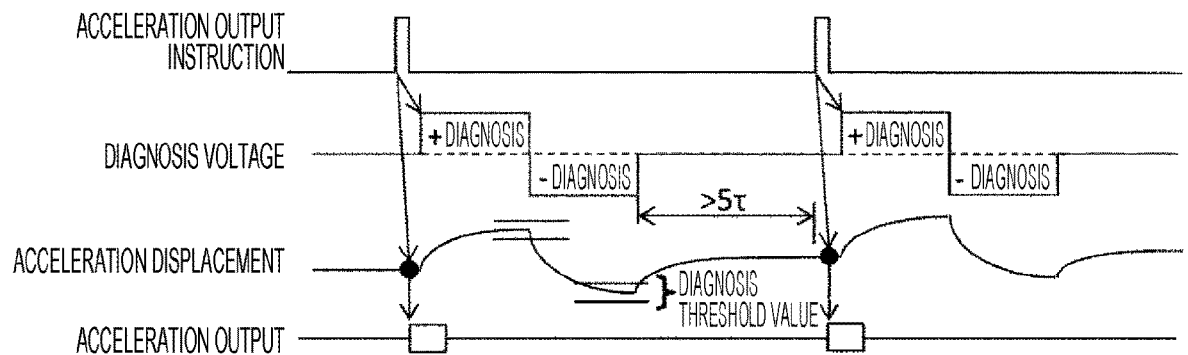
FIG. 5 is a time chart illustrating a basic acceleration diagnosis operation of the embodiment.

Next, an operation will be described. FIG. 5 is a time chart for describing a basic operation of the present invention.

The communication 20 of FIG. 1 receives a signal of the acceleration output instruction from the ECU 2, and outputs a diagnosis instruction signal to the diagnosis control 18 when storage of an acceleration output that needs to be output into a transmission buffer is completed. The diagnosis control 18 detects a cycle of the acceleration output instruction signal periodically received from the ECU 2 using the instruction detection 181 and the instruction interval detection 182 in FIG. 2. The timing adjustment 183 determines that it is possible to execute the acceleration diagnosis by continuously applying positive (+) and negative (−) voltages in one cycle in order for the low-pass filter 181 to reach a stable state (for example, a lapse of time of 5τ or more when a time constant is τ) from the detected cycle to reception of reception of the next acceleration instruction signal. Then, as illustrated in FIG. 5, the diagnosis instruction signal is output to the acceleration diagnosis 19 at the same time as the transmission of the acceleration output immediately after the diagnosis instruction signal from the communication 20 is input, whereby the acceleration diagnosis is executed.

In FIG. 5, the oscillator 11 is displaced upward when the diagnosis voltage is positive and displaced downward when the diagnosis voltage is negative, but the acceleration displacement is gently displaced since the displacement signal passes through the low-pass filter a. If a vertex of the displacement is within a range between the upper limit value and the lower limit value set as the threshold values 192 in the determination 193 of FIG. 3, it is determined that the operation is normal.

Figure 6:
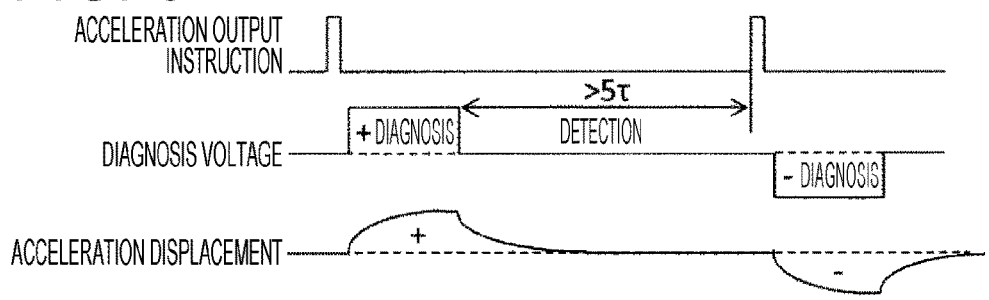
FIG. 6 is a time chart illustrating a diagnosis operation by voltage adjustment of the embodiment.

FIG. 6 is a time chart for describing an operation of the embodiment in which the polarity of the diagnostic applied voltage is alternately switched for each acceleration output from the communication 20 to the ECU 1 in the present invention. As in the embodiment of FIG. 5, the diagnosis control 18 detects the cycle of the acceleration output instruction signal periodically received from the ECU 2 using the instruction detection 181 and the instruction interval detection 182 in FIG. 2. The timing adjustment 183 determines that it is difficult to alternately apply positive (+) and negative (−) voltages in one cycle such that the low-pass filter 181 reaches the stable state (the lapse of time of 5τ or more when the time constant is τ) from the detected cycle to reception of reception of the next acceleration instruction signal and to execute the acceleration diagnosis. Then, as illustrated in FIG. 5, positive and negative voltages are alternately applied to the acceleration diagnosis 19 for each cycle at the same time as transmission of an acceleration output immediately after the diagnosis instruction signal from the communication 20 is input, thereby executing the acceleration diagnosis.

Figure 7:
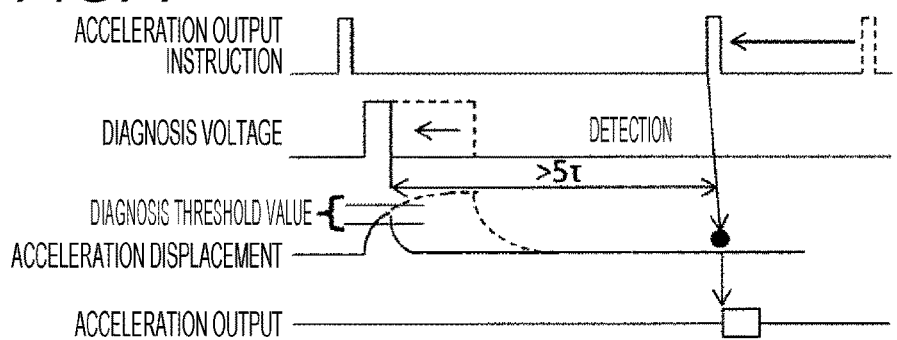
FIG. 7 is a time chart illustrating a diagnosis operation by threshold value adjustment of the embodiment.

FIG. 7 is a time chart illustrating the embodiment in a case of changing a diagnosis threshold value in the present invention. When the low-pass filter 181 fails to reach the stable state (the lapse of time of 5τ or more when the time constant is τ) in the case where the positive and negative diagnosis is alternately executed for each cycle as illustrated in the embodiment of FIG. 6 based on a result of the instruction interval detection 182 in FIG. 2, a voltage application time is directly shortened to secure the time to allow the low-pass filter 181 to reach the stable state. As a result, the acceleration displacement signal does not reach a prescribed threshold value indicated by the broken line as illustrated in FIG. 7. Thus, diagnosis is executed by lowering the threshold value.

Figure 8:
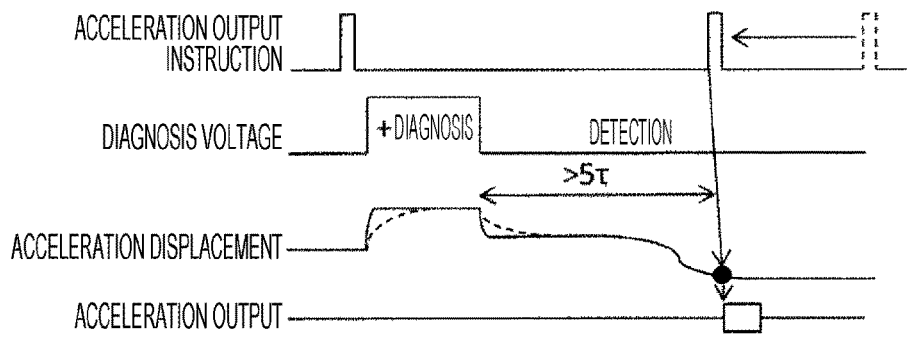
FIG. 8 is a time chart illustrating a diagnosis operation by filter selection of the embodiment.

FIG. 8 is a time chart illustrating the embodiment in the case of changing the low-pass filter between the time of acceleration detection and the time of diagnosis in the present invention. When the low-pass filter 181 fails to reach the stable state (the lapse of time of 5τ or more when the time constant is τ) in the case where the positive and negative diagnosis is alternately executed for each cycle as illustrated in the embodiment of FIG. 6 based on a result of the instruction interval detection 182 in FIG. 2, the low-pass filter b is selected using a filter selection signal input to the filter 16 of FIG. 4 from the diagnosis control 18 of FIG. 2, thereby shortening the rise and fall time of the acceleration displacement signal depending on the application of the diagnosis voltage. The broken line in the drawing represents a waveform when the low-pass filter a is selected.

In addition, as another embodiment, an input signal (time constant τ=0) to the low-pass filter a may be used at the time of acceleration diagnosis instead of switching between the two low-pass filters.

Figure 9:
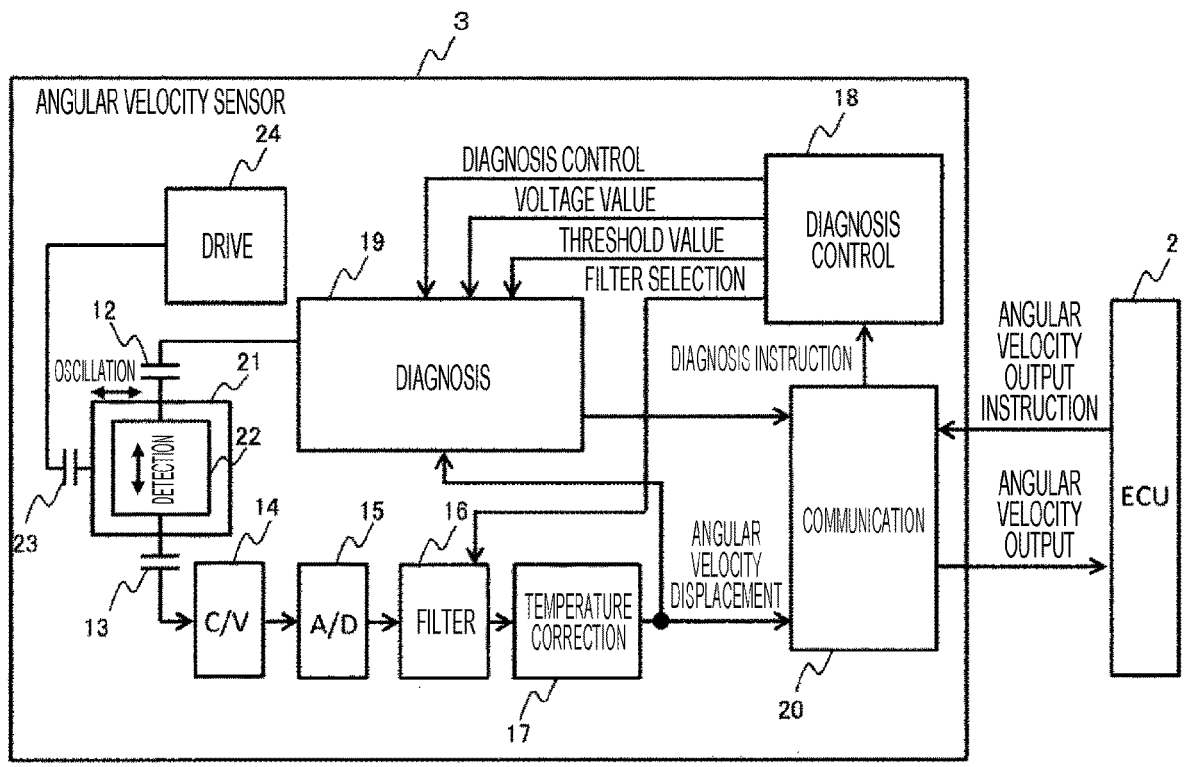
FIG. 9 is a block diagram of an angular velocity sensor of a second embodiment.

FIG. 9 is a block diagram of an angular velocity sensor according to a second embodiment. An angular velocity detection element 21 resonantly oscillates constantly in an oscillation direction as an AC signal having constant frequency and amplitude is applied from a drive unit 22 via an electrode 23. When angular velocity is applied in such a state, an oscillator 22 is displaced in a detection direction due to a Coriolis force. The electrode 13 detects the amount of displacement in the vertical direction based on a change in electrostatic capacitance. The electrode 12 applies a diagnosis voltage and forcibly displaces the oscillator 22 in the vertical direction. Processing of functional blocks other than the above-described ones in FIG. 9 is the same as that of the acceleration sensor in FIG. 1.

Figure 10:
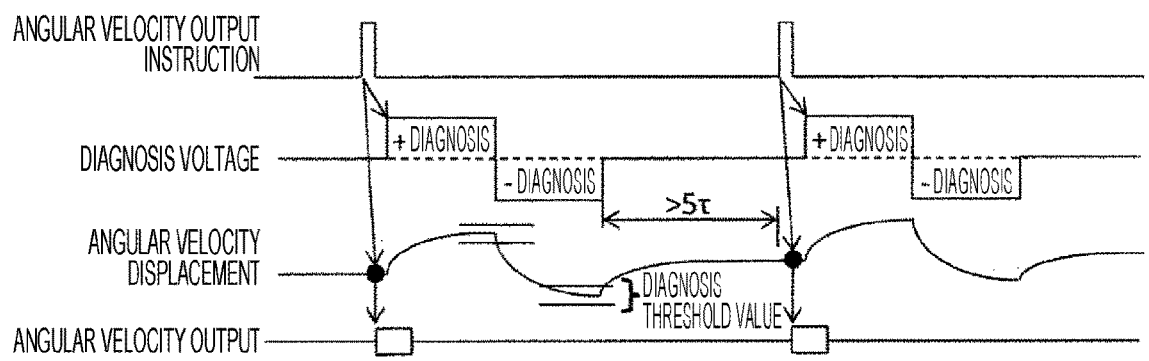
FIG. 10 is a time chart illustrating a basic angular velocity diagnosis operation of the second embodiment.

Next, an operation will be described. FIG. 10 is a time chart for describing a basic operation of a second embodiment. The communication 20 of FIG. 9 receives a signal of an acceleration output instruction from the ECU 2, and outputs a diagnosis instruction signal to the diagnosis control 18 when storage of an angular velocity output that needs to be output into a transmission buffer is completed. The diagnosis control 18 detects a cycle of the acceleration output instruction signal periodically received from the ECU 2 using the instruction detection 181 and the instruction interval detection 182 in FIG. 2. The timing adjustment 183 determines that it is possible to execute the angular velocity diagnosis by continuously applying positive (+) and negative (−) voltages in one cycle in order for the low-pass filter 181 to reach a stable state (for example, a lapse of time of 5τ or more when a time constant is τ) from the detected cycle to reception of the next acceleration instruction signal. Then, as illustrated in FIG. 10, the diagnosis instruction signal is output to the angular velocity diagnosis 19 at the same time as the transmission of the acceleration output immediately after the diagnosis instruction signal from the communication 20 is input, whereby the angular velocity diagnosis is executed.

In FIG. 10, the oscillator 11 is displaced upward when the diagnosis voltage is positive and displaced downward when the diagnosis voltage is negative, but the angular displacement is gently displaced since the displacement signal passes through the low-pass filter a. If a vertex of the displacement is within a range between the upper limit value and the lower limit value set as the threshold values 192 in the determination 193 of FIG. 3, it is determined that the operation is normal.

Further, it is possible to execute the same operation except than a sensor output becomes angular velocity in the time charts of FIGS. 6 to 8 illustrating the operation of the acceleration sensor which is the first embodiment illustrated in FIG. 1.

REFERENCE SIGNS LIST 1 acceleration sensor
11 oscillator
12, 13 electrode
14 capacitance detector
15 AD converter
16 filter
17 temperature correction
18 diagnosis control
19 acceleration diagnosis
20 communication
161 low-pass filter a
162 low-pass filter b
163 switch
164 latch
165 subtractor
166 switch
181 instruction detection
182 instruction interval detection
183 timing adjustment
184 Voltage adjustment
185 threshold value adjustment
186 filter adjustment

The invention claimed is:
1. An inertial force detection device configured to measure an inertial force based on a displacement amount of an oscillator, wherein the inertial force detection device is configured to:
periodically receive an output instruction signal from an external device at a set cycle;
in response to receiving the output instruction signal, apply a diagnosis voltage to an electrode of an oscillator, wherein
when a cycle length of the periodically received output instruction signal is sufficient to apply positive and negative diagnosis voltages, apply both positive and negative diagnosis voltages to the electrode during one cycle of the output instruction signal, and
when a cycle length of the periodically received output instruction signal is insufficient to apply positive and negative diagnosis voltages, apply only one of a positive or negative diagnosis voltage to the elec- trode during one cycle of the output instruction signal, and only the other diagnosis voltage during a next one cycle;

detect an amount of displacement of the oscillator based on the diagnosis voltage; and measure an inertial force based on the detected amount of displacement.

2. The inertial force detection device according to claim 1, wherein
a period during which the diagnosis voltage is applied is shorter than a cycle of the output instruction signal by a predetermined period.

3. The inertial force detection device according to claim 1, wherein
at least one of a period during which the diagnosis voltage is applied, the diagnosis voltage, a diagnosis threshold value, or a filter characteristic is changed in accordance with a cycle of the output instruction signal.

4. The inertial force detection device according to claim 1, wherein the inertial force detection device is configured to detect a diagnostic result by applying the diagnosis voltage and to output the diagnostic result in synchronization with the next cycle of an output signal.

5. The inertial force detection device according to claim 1, wherein the inertial force detection device is configured to output a signal indicating presence or absence of an influence caused by application of the diagnosis voltage in synchronization with an acceleration output signal.

6. The inertial force detection device according to claim 1, wherein the inertial force detection device is configured to:
detect a cycle length of the output instruction signal; and
determine whether to apply both positive and negative diagnosis voltages during a cycle to the electrode based on the detected cycle length.

7. The inertial force detection device according to claim 1, wherein the inertial force device is coupled to a vehicle, and wherein the inertial force detection device is configured to:
apply the diagnosis voltage to the electrode of the oscillator when the vehicle is in a predetermined state in which the vehicle stops on a slope or accelerates during traveling; and
detect the amount of displacement of the oscillator caused only by the application of the diagnosis voltage to the electrode of the oscillator when the vehicle is in the predetermined state.

\* \* \* \* \*